(12) United States Patent
De Amorim et al.

(10) Patent No.: US 8,219,135 B2
(45) Date of Patent: Jul. 10, 2012

(54) METHOD FOR BUILDING SPONTANEOUS VIRTUAL COMMUNITIES BASED ON COMMON INTERESTS USING WIRELESS EQUIPMENT

(75) Inventors: Claudio Luis De Amorim, Cosme Velho (BR); Renato de Castro Dutra, Barra da Tijuca (BR); Luiz Maltar Catello Branco, Maracana (BR)

(73) Assignee: COPPE/UFRJ-Coordenacao dos Programas de Pos Graduacao de Engenharia da Universidade Federal do Rio de Janeiro, Rio de Janeiro (BR)

( * ) Notice: Subject to any disclaimer, the term of this patent is extended or adjusted under 35 U.S.C. 154(b) by 690 days.

(21) Appl. No.: 12/227,054

(22) PCT Filed: Aug. 17, 2007

(86) PCT No.: PCT/BR2007/000211
§ 371 (c)(1),
(2), (4) Date: Nov. 4, 2008

(87) PCT Pub. No.: WO2008/019462
PCT Pub. Date: Feb. 21, 2008

(65) Prior Publication Data
US 2009/0149206 A1    Jun. 11, 2009

(30) Foreign Application Priority Data
Aug. 18, 2006    (BR) ...................................... 0603938

(51) Int. Cl.
*H04B 7/00* (2006.01)
(52) U.S. Cl. ........................ 455/519; 455/518; 455/41.2
(58) Field of Classification Search ................. 455/41.2, 455/420, 500, 553.1, 552.1, 432.3, 517–519
See application file for complete search history.

(56) References Cited

U.S. PATENT DOCUMENTS

| | | | |
|---|---|---|---|
| 7,912,902 B2 * | 3/2011 | Cheng et al. | 709/205 |
| 2002/0098849 A1 * | 7/2002 | Bloebaum et al. | 455/456 |
| 2003/0129985 A1 * | 7/2003 | Naden et al. | 455/447 |
| 2004/0234048 A1 * | 11/2004 | Hahn et al. | 379/88.17 |
| 2005/0267766 A1 * | 12/2005 | Galbreath et al. | 705/1 |
| 2006/0209927 A1 * | 9/2006 | Khandekar et al. | 375/146 |
| 2006/0270395 A1 * | 11/2006 | Dhawan et al. | 455/418 |
| 2006/0271975 A1 * | 11/2006 | Sun et al. | 725/87 |
| 2007/0264981 A1 * | 11/2007 | Miller | 455/414.1 |
| 2008/0037723 A1 * | 2/2008 | Milstein et al. | 379/88.12 |

* cited by examiner

*Primary Examiner* — Dominic E Rego
(74) *Attorney, Agent, or Firm* — Fildes & Outland, P.C.

(57) ABSTRACT

The present invention refers to a method for establishing a communication network that connects a group or community of users using wireless equipments according to their defined interests. These equipments are preferentially portable, low cost, and user-friendly, where each equipment must be configurable using its user's profile, which contains a small amount of the user's personal data, namely the miniprofile. The method uses a collection of such miniprofiles to transparently set a communication network among the associate users to establish a virtual community. In addition, each profile will contain further information on user's interests, which the method will propagate across the communication network to the established virtual community in a way that their members will be able to form groups based on common interests while allowing for interaction among their members. The user profile can be set identifiable or anonymous, may or not be shareable in relation to the other members of a group. The method is distributed, and supports spontaneous and volatile communication networks, preferentially.

36 Claims, 2 Drawing Sheets

METHOD FOR BUILDING SPONTANEOUS VIRTUAL COMMUNITIES BASED ON COMMON INTERESTS USING WIRELESS EQUIPMENT

FIELD OF THE INVENTION

This invention relates to a method of communication between equipments, for example, wireless equipments, but is by no means limited to this kind of equipment. Each equipment may have sensor capabilities, can store user's information embedded as miniprofile and/or information of a group of users, and can make anonymous the user identity, so that users of such equipments in a determined region can detect automatically other users, and then transfer automatically and aggregate their miniprofiles, in such a way to spontaneously create or identify virtual communities based on some set of shared interests and/or affinities while allowing for interaction among such a virtual community of users. Specifically, when such an equipment with a stored miniprofile is detected by another equipment with stored miniprofile, the method forces both equipments to exchange and aggregate automatically their miniprofiles so that their users will be able to know the aggregated miniprofile. The method will be similarly applied to other such equipments detected in the same region in that their stored miniprofiles will be further exchanged and aggregated until every equipment holds the aggregate miniprofile of the equipments across the region. In this way, the present method will allow the equipments to build a wireless communication network through which the connected users can form spontaneous virtual communities based on the miniprofiles of their users. The limits of a region is defined by the communication technology being used and/or can be set according to the user's convenience. Any connected user can send queries and receive-answers to/from the users or members of virtual communities. For each query, the user can receive none, one, or multiple answers. In the latter case, the equipment can make use of statistical methods to provide aggregates of the answers it receives.

BACKGROUND OF THE INVENTION

Currently, there are many kinds of computing equipments that can be interconnected to support network-based information processing systems (NIPS). The system architecture of those equipments includes a processor, memory, wireless interface, power supply, A/D converters, and sensors. A variety of equipments fits this architecture in different degrees, including RFIDs, MOTEs, cellular phones, IPODs, IPAQs, PDAs, Pagers, PALMs, GPS, personal computers, among others. Most often, NIPS follow the centralized client-server model, where a particular equipment acts as a central processing node or server by making routing decisions and/or schedules tasks to be executed across the other equipments in the network. As an example of a centralized client-server model we refer to the patent US 2005/0272413 A1 which comprises a method to concentrate all the communication in a server. Another example is the patent US 2005/0272413 A1 that discloses a method to use RFID under a client-server model with a controller for a group of users. Sensor Networks follow a distributed model that uses small portable equipments, usually with batteries, and wireless communication that employs ZIGBEE, Bluetooth, or another known protocol to build a network. These equipments are manufactured with microprocessor, memory, and sensors, can be programmed according to a variety of distributed models, and have constraints on energy consumption, processing power, and memory capacity. Cellular telephony is a wireless communication system that uses several technologies, such as TDMA, CDMA, and GSM and works as follows. If one cellular phone operated by the Telco operator A needs to communicate with another cellular phone operated by a different Telco operator B, the cellular phone connects with a central operator A, which connects with central operator B, through a translator of the system A to System B, that connects with the cellular phone at the System B. Thus, the Cellular Telephony system is centralized. PALMs, PDAs, and any other equipments that provide Digital Assistance can use protocols such as Bluetooth, ZIGBEE, WiFi, WiMax, to connect with a centralized or distributed communication system, In contrast with previous state-of-art networks described above, the present invention has the purpose of building spontaneous virtual communities or/and groups based on miniprofiles. The network nodes can be volatile in the sense that any user can join the virtual community whether in an anonymous fashion or not by moving into the region with his/her equipment switched on or leave the community when the user wishes either by going away of the region or switching off the user's equipment. The information stored in the equipment is used to automatically establish the network and the virtual groups. In contrast, Cellular phone systems rely on different networks using different technologies and protocols such that one cellular cannot connect with another cellular directly, through a distributed and anonymous architecture. Communication systems for PDAs, PALMs, and so on, support a limited number of connected equipments. Moreover, their protocols do not support spontaneous or anonymous user features. Sensors networks support volatility, but state-of-the art methods and protocols they use do not allow for networks to be built spontaneously.

DETAILED DESCRIPTION OF THE PREFERRED EMBODIMENTS OF THE INVENTION

The method is now disclosed: a wireless equipment with an embedded miniprofile approaches another wireless equipment that holds another miniprofile. Both equipments send an automatic join request, based on their respective miniprofiles. Any of the two equipments can receive the request, accept the request, aggregate the received miniprofile to a local database, and establish the connection. Thus the method when applied to two or more equipments will establish a virtual community, where any user or member joins or leaves at any moment he/she wishes. The user can send queries to the network using the equipment, in this case the network will send the query to other equipments through the established networks, up to a limit given by a pre-defined area that is defined either by the equipments' communication technologies or set by the user at his/her convenience. Every reachable equipment will then send a reply based on its embedded miniprofile and/or profile, through the established connections, using the established community/group.

INVENTION OBJECTIVES

The invention objectives comprise:
1) To build spontaneous virtual communities or/and groups using information stored in wireless equipments. Communication is distributed without the need for a controller or central element;
2) The user can directly enter data to the wireless equipment, data can be acquired from the user through some method, or data may be acquired from the environment by sensors and stored in the equipment.

3) All the wireless equipments being used can receive, transmit, request, and provide services concurrently;
4) There are two main entities in the equipments that the method uses to build groups or communities: the first is the miniprofile, a small amount of information configured by the user or pre-configured by a third-party; the second is the profile, a larger set of information that users will enter into the equipment to define their personal interests;
5) The miniprofile is created with a number of pre-defined keywords;
6) The wireless equipment uses its miniprofile to establish communication with other equipments;
7) The miniprofile can be used, or not, to identify the wireless equipment or/and the user;
8) Communication is established as follows: an unconnected wireless equipment will automatically send its miniprofile to other(s) equipment(s) previously connected to a group and/or wireless community. These equipments will store the miniprofile of the unconnected equipment and then will propagate it up to a pre-defined number of equipments.
9) The pre-defined number of wireless equipments is determined by the available wireless technology, and is not limited by the invention itself;
10) An unconnected wireless equipment is defined as either: (a) a wireless equipment that approaches to a group of wireless equipments and that emits a radiofrequency signal within the sensitivity range of the wireless receiver of some equipment of the group of equipments, or, (b) equipment switched on and physically close to a group of equipments and that emits a radiofrequency signal within the sensitivity range of the wireless receiver of some equipment of the group of equipments;
11) The miniprofile and/or profile consists of any information that the user enters into the wireless equipment, and it is limited by the memory capacity of the equipment, and not by a limit set by the invention itself;
12) The miniprofile or/and profile is queried by external requests when the external wireless equipments need remote user information;
13) The miniprofile or/and profile, or part of such information, is sent to the equipments connected within a group, either by the user request or by external requests;
14) External or remote request is defined as any request of service started either by a wireless equipment to another equipment, or by an user that is not the equipment owner, or, by the equipment that provides a service;
15) One advantage of this invention, beyond technical art, is represented by a fully distributed approach without a server or central controller;
16) Another advantage of this invention, beyond technical art, is represented by the introduction of the miniprofile, an entity used to establish the automatic connection between equipments;
17) Another advantage of this invention, beyond technical art, is represented by the network being spontaneous and volatile;
18) Another advantage of this invention, beyond technical art, is represented by storing the information acquired by sensors into the user profile, thus combining in a single entity information about users and the environment;
19) To use a distributed system that can exchange, or not, information between equipments;
20) The invention that allows the user to benefit from it in either anonymous or identifiable mode.

BRIEF DESCRIPTION OF THE DRAWINGS

FIG. 1 is a block diagram that illustrates the equipments when communicating inside and outside the network.
FIG. 2 shows some equipments joined to form a virtual community. Cloud 102 is a graphical representation of a network that aggregates various groups/communities established through the communication between the equipments 101.
In this context, groups/communities are defined as any aggregate of users that are formed due to spatial, temporal, and/or information sharing criteria.
Users, in this context, are defined as any entity, animated or unanimated, that carry equipments 101. A bidirectional arrow 103 represents a bidirectional communication between equipments 101.
This bidirectional communication can occur using any wireless technology in the technical art, and in any communication protocol that exists or that will exist.
A bidirectional arrow 104 represents a bidirectional communication between the system, built by groups/communities, and any public or private service communication, which is called in this invention as Outside Network 105. This communication can occur, or not, depending on the application being implemented.
FIG. 1 shows how the method for building groups/communities is used to exchange information, as represented by bidirectional arrow 103, between equipments 101. The exchanged information is used to build the communication system for groups/communities 102, according to common interests, which may be spatial, temporal, or data. An user or user group may communicate with a communication system 105, through bidirectional communication 104 if necessary.
FIG. 2 is a block diagram, illustrating equipments 201 and a system to build groups/communities, consisting of two groups 202 and 203, divided by the imaginary line 204. This division can be obtained from spatial, timing, and data parameters, including the use of a password to access the group. Groups/communities may be isolated, with no need to exchange information between different groups/communities, as given by the graphical line 204.

INDUSTRIAL APPLICATION

Figure 1:
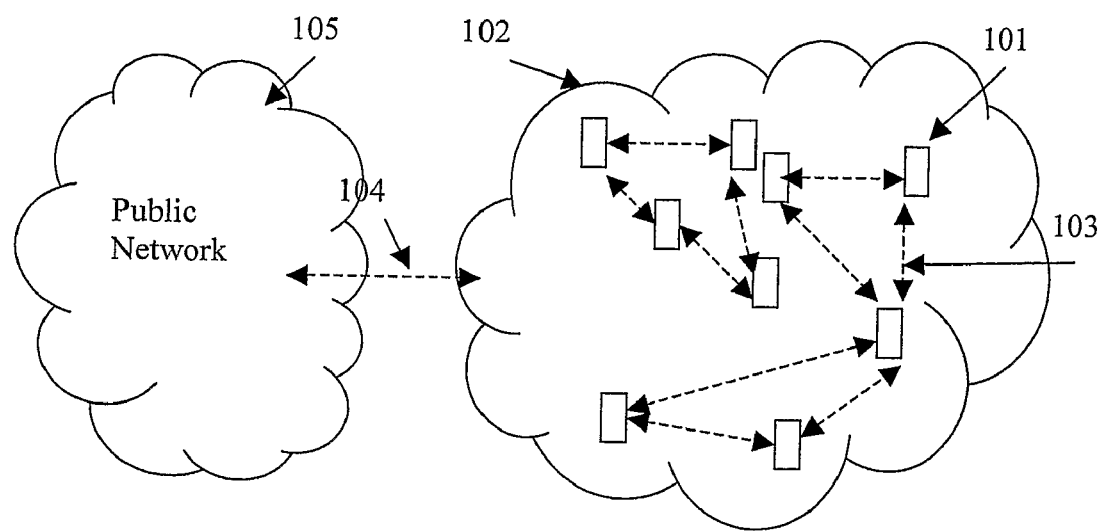
FIGS. 1 and 2 are presented to provide better understanding of the invention.
Figure 2:
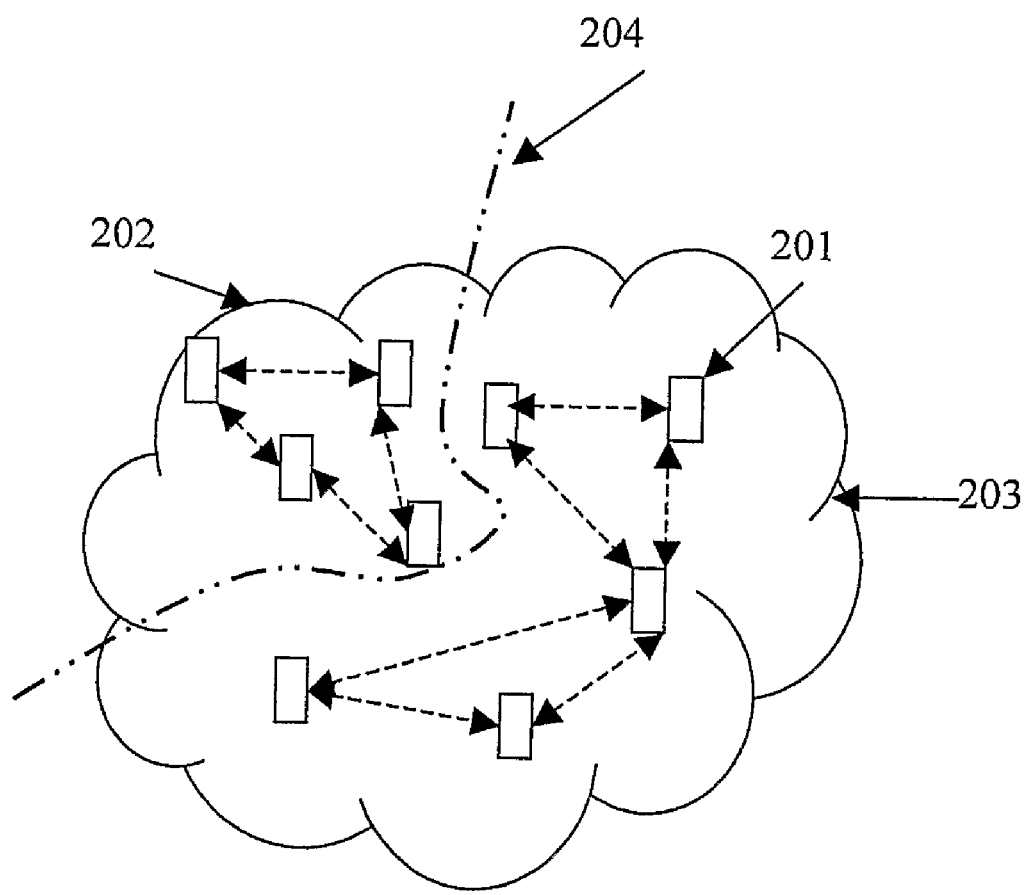

The invention has an immediate application within the entertainment industry, in that, people will buy and use equipments 101 voluntarily to build spontaneous groups/communities. These virtual communities can be used to exchange information of collective or individual interests, possibly with password protection, can help in safety and security procedures, can be used to reach agreement on individual or collective issues, and to suggest places for personal or group entertainment, among others. The equipment 101 can be attached to a student card or bus card, or attached to a cellular phone, or it can be a button received at check-in to private places, or it can be an electronic-identifier, and can be used to opinion polls or acquire information from passers by.

The invention claimed is:
1. A method for building groups and communities of users using distributed communication of a plurality of wireless equipment, said method comprising the steps of:

configuring a miniprofile and a profile in each of said equipment;

sending and receiving messages using said equipment, said messages including said miniprofile and profile of said equipment;

establishing said distributed communication using said miniprofile and said profile of said equipment, said distributed communication comprising the steps of;

upon receiving said messages, said equipment presenting said messages to said users if said profile of said messages is equal to said profile of said equipment; and forwarding said messages if said miniprofile of said messages is equal to said miniprofile of said equipment, otherwise discarding said messages.

2. The method of claim 1, wherein one of said groups, communities, and a combination of groups and communities are built.

3. The method of claim 1, wherein one of said groups, communities, and a combination of groups and communities are spontaneous.

4. The method of claim 1, wherein said user does one of excluding or including said equipment voluntarily.

5. The method of claim 1, wherein said equipment forwards information received from other said equipment.

6. The method of claim 1, wherein said user defines information to be confidential.

7. The method of claim 1, wherein said user defines information to be publicly available.

8. The method of claim 7, wherein said user can participate in searches for information.

9. The method of claim 1, wherein said equipment can communicate with external elements that are outside one of said groups, communities, and a combination of groups and communities.

10. The method of claim 1, wherein said equipment is programmable by said user.

11. The method of claim 1, wherein said equipment is remotely programmable.

12. The method of claim 1, wherein a coverage region is one of open and closed.

13. The method of claim 1, wherein one of said miniprofile and said profile is one of fully used, partially used, and a combination of fully used and partially used.

14. The method of claim 1, wherein said wireless communication network is fully distributed.

15. The method of claim 1, wherein said miniprofile is based on one of spatial data, temporal data, data information, and a combination of spatial data and temporal data and data information.

16. The method of claim 1, wherein said profile is based on one of spatial data, temporal data, data information, and a combination of spatial data and temporal data and data information.

17. The method of claim 1, wherein said user uses a password.

18. The method of claim 17, wherein said profile is accessed.

19. The method of claim 17, wherein said miniprofile is accessed.

20. The method of claim 1, wherein said equipment has an identification.

21. The method of claim 1, wherein said equipment is anonymous.

22. The method of claim 1, wherein said message is one of an invitation to vote and a vote.

23. The method of claim 1, wherein said message is an alarm warning sent by a sensor.

24. The method of claim 1, wherein the use of said miniprofile and said profile generates one of said groups, said communities, and a combination of said groups and said communities.

25. The method of claim 24, wherein said user asks a question to and receives answers from one of said groups, said communities, and a combination of said groups and said communities.

26. The method of claim 24, wherein said user is rejected by one of said groups, said communities, and a combination of said groups and said communities.

27. The method of claim 24, wherein said user is accepted by one of said groups, said communities, and a combination of said groups and said communities.

28. The method of claim 24, wherein said user is ignored by one of said groups, said communities, and a combination of said groups and said communities.

29. The method of claim 1, wherein said equipment is configured externally.

30. The method of claim 1, wherein said equipment includes an apparatus for data display and an apparatus for data input.

31. The method of claim 1, wherein information of said messages is aggregated and joined.

32. The method of claim 1, wherein information of said messages is not aggregated.

33. The method of claim 1, wherein said equipment exchange said messages with each other.

34. The method of claim 33, wherein said equipment uses said communication networks with identification.

35. The method of claim 33, wherein more than one user join to one of said groups, said communities, and a combination of said groups and said communities.

36. The method of claim 33, wherein more than one of said equipment joins to said communication network.

* * * * *